(12) United States Patent
Yerramalli et al.

(10) Patent No.: US 11,510,243 B2
(45) Date of Patent: Nov. 22, 2022

(54) TRANSMISSION COUNTDOWN AND IMPROVEMENTS FOR A BEAM BASED CHANNEL ACCESS PROCEDURE

(71) Applicant: QUALCOMM Incorporated, San Diego, CA (US)

(72) Inventors: Srinivas Yerramalli, San Diego, CA (US); Arumugam Chendamarai Kannan, San Diego, CA (US); Vinay Chande, San Diego, CA (US); Xiaoxia Zhang, San Diego, CA (US); Tao Luo, San Diego, CA (US); Sungwoo Park, San Diego, CA (US); Wooseok Nam, San Diego, CA (US); Jing Sun, San Diego, CA (US); Kaushik Chakraborty, San Diego, CA (US); Zhifei Fan, San Diego, CA (US); Mostafa Khoshnevisan, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 22 days.

(21) Appl. No.: 16/910,830

(22) Filed: Jun. 24, 2020

(65) Prior Publication Data
US 2021/0029740 A1 Jan. 28, 2021

Related U.S. Application Data

(60) Provisional application No. 62/878,052, filed on Jul. 24, 2019.

(51) Int. Cl.
*H04W 74/08* (2009.01)
*H04B 7/06* (2006.01)
(Continued)

(52) U.S. Cl.
CPC ...... *H04W 74/0808* (2013.01); *H04B 7/0695* (2013.01); *H04W 88/08* (2013.01)

(58) Field of Classification Search
CPC . H04W 74/0808; H04W 88/08; H04W 16/28; H04W 72/12; H04B 7/0695
See application file for complete search history.

(56) References Cited

U.S. PATENT DOCUMENTS 10,523,282 B2 * 12/2019 Feldhahn ............... H04B 7/024
2007/0258431 A1 * 11/2007 Shin ........................ H04L 12/66
 370/345
(Continued)

OTHER PUBLICATIONS

International Search Report and Written Opinion—PCT/US2020/039600—ISA/EPO—dated Sep. 18, 2020.

*Primary Examiner* — Harry H Kim
(74) *Attorney, Agent, or Firm* — Harrity & Harrity, LLP

(57) ABSTRACT

This disclosure provides systems, methods, and apparatuses for a beam-based channel access countdown procedure. In one aspect, a channel sensing beam may be permitted to include one or more transmit beams and, thus, may differ from a transmit beam that is to be used for a transmission. As such, defining a manner in which a channel access countdown procedure is performed is desirable. Some aspects described herein provide techniques and apparatus for a beam-based channel access countdown procedure. In some aspects, the systems, methods, and apparatuses described herein provide a beam-based channel access countdown procedure that allows a single channel sensing beam, including multiple transmit beams, to be utilized in association with determining channel availability for the multiple transmit beams, thereby improving performance of beam-based directional transmissions.

30 Claims, 8 Drawing Sheets

(51) Int. Cl.
*H04W 88/08* (2009.01)
*H04W 16/28* (2009.01)
*H04W 72/12* (2009.01)
*H04W 72/04* (2009.01)
*H04W 74/04* (2009.01)

(56) References Cited

U.S. PATENT DOCUMENTS

| | | | |
|---|---|---|---|
| 2016/0014722 A1* | 1/2016 | Yoon | H04M 1/72412 455/552.1 |
| 2017/0202022 A1* | 7/2017 | Chendamarai Kannan | H04W 74/006 |
| 2017/0231011 A1* | 8/2017 | Park | H04W 72/0446 |
| 2019/0215140 A1 | 7/2019 | Hafeez et al. | |
| 2020/0267736 A1* | 8/2020 | Hafeez | H04W 74/02 |
| 2020/0336927 A1* | 10/2020 | Zhang | H04W 72/0446 |
| 2020/0374932 A1* | 11/2020 | Chen | H04W 72/1257 |
| 2021/0194756 A1* | 6/2021 | Babaei | H04L 41/0654 |
| 2021/0235513 A1* | 7/2021 | Kim | H04W 74/0891 |
| 2021/0259015 A1* | 8/2021 | Wang | H04W 72/1289 |

* cited by examiner

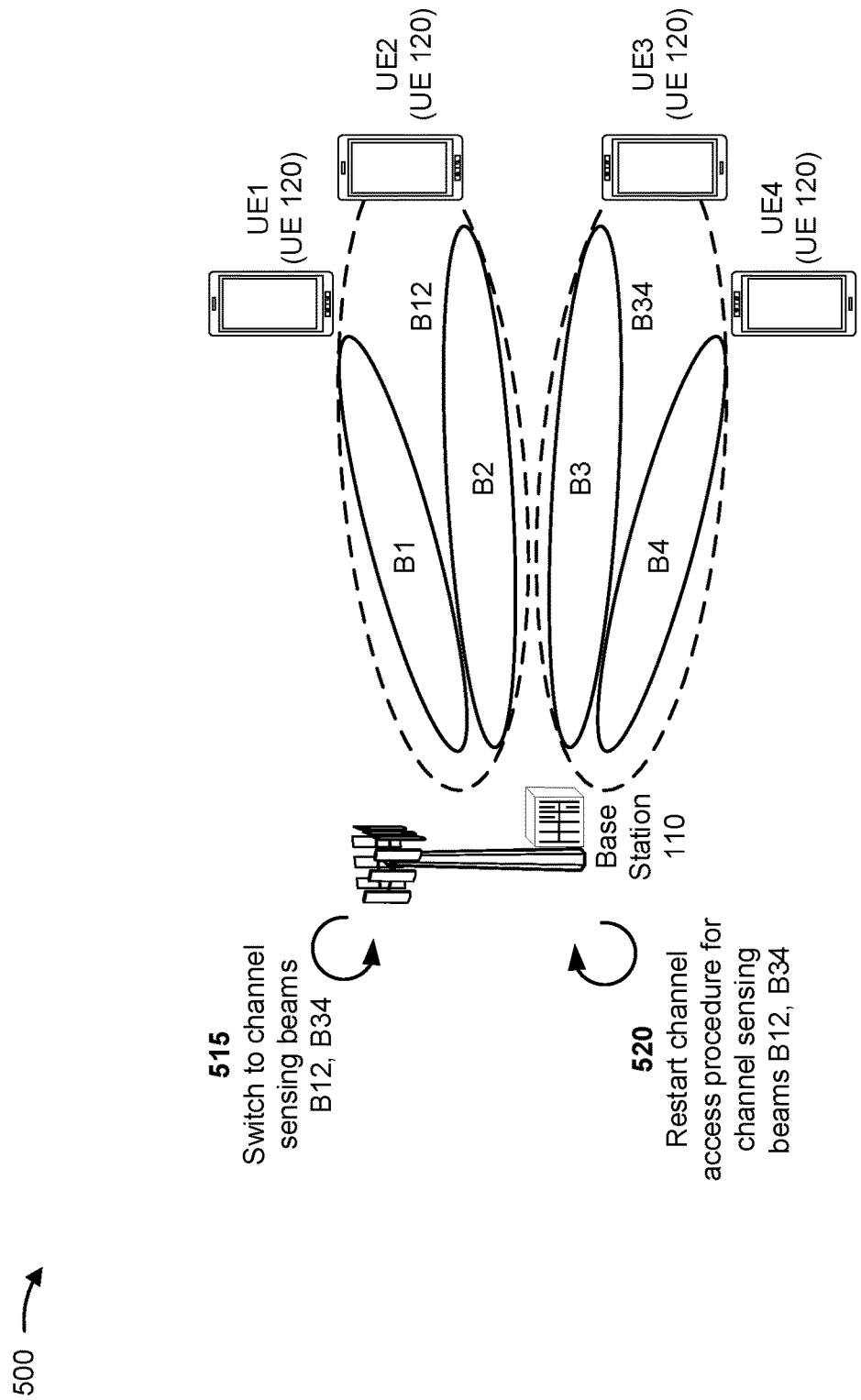

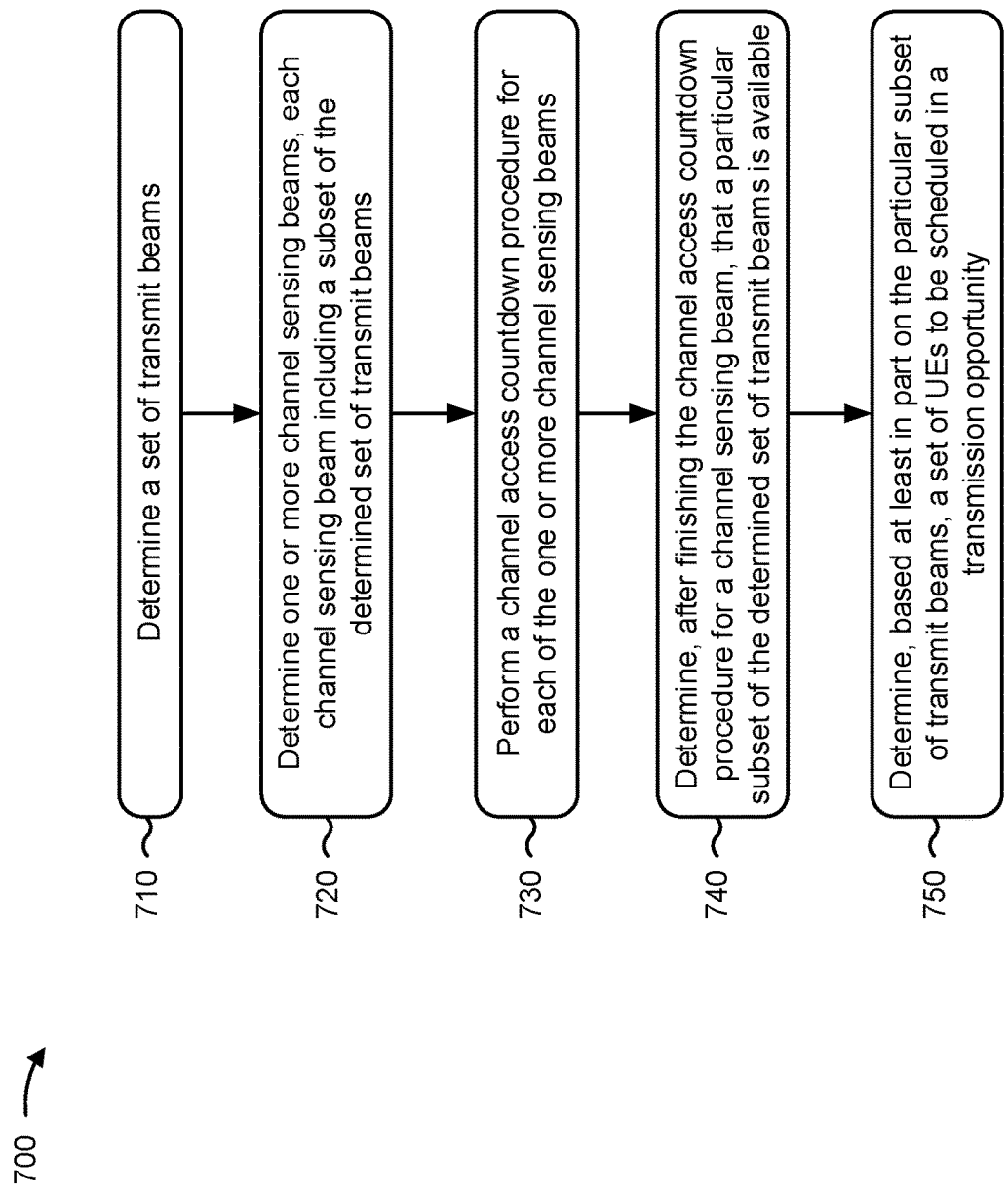

TRANSMISSION COUNTDOWN AND IMPROVEMENTS FOR A BEAM BASED CHANNEL ACCESS PROCEDURE

CROSS-REFERENCE TO RELATED APPLICATION

This Patent Application claims priority to U.S. Provisional Patent Application No. 62/878,052, filed on Jul. 24, 2019, entitled "TRANSMISSION COUNTDOWN AND IMPROVEMENTS FOR A BEAM BASED LISTEN-BEFORE-TALK PROCEDURE," and assigned to the assignee hereof. The disclosure of the prior Application is considered part of and is incorporated by reference into this Patent Application.

TECHNICAL FIELD

Aspects of the present disclosure relate generally to wireless communication and to techniques for transmission countdown and improvements for a beam based channel access procedure.

DESCRIPTION OF THE RELATED TECHNOLOGY

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, transmit power, etc.). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipments (UEs). A user equipment (UE) may communicate with a base station (BS) via the downlink (DL) and uplink (UL). The DL (or forward link) refers to the communication link from the BS to the UE, and the UL (or reverse link) refers to the communication link from the UE to the BS. As will be described in more detail herein, a BS may be referred to as a NodeB, an LTE evolved nodeB (eNB), a gNB, an access point (AP), a radio head, a transmit receive point (TRP), a New Radio (NR) BS, a 5G NodeB.

The above multiple access technologies have been adopted in various telecommunication standards to provide a common protocol that enables different UEs to communicate on a municipal, national, regional, and even global level. NR, which also may be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency-division multiplexing (OFDM) with a cyclic prefix (CP) (CP-OFDM) on the DL, using CP-OFDM or SC-FDM (for example, also known as discrete Fourier transform spread OFDM (DFT-s-OFDM)) on the UL (or a combination thereof), as well as supporting beamforming, multiple-input multiple-output (MIMO) antenna technology, and carrier aggregation.

SUMMARY

The systems, methods, and devices of this disclosure each have several innovative aspects, no single one of which is solely responsible for the desirable attributes disclosed herein.

One innovative aspect of the subject matter described in this disclosure can be implemented in a method of wireless communication performed by a base station. The method may include determining a set of user equipments (UEs) to be scheduled in a transmission opportunity (TxOP); determining a set of transmit beams to be transmitted to the set of UEs; determining, based at least in part on the determined set of transmit beams, one or more channel sensing beams, where each channel sensing beam of the one or more channel sensing beams includes a subset of the determined set of transmit beams; and performing a channel access countdown procedure for each of the one or more channel sensing beams.

In some aspects, the method can include transmitting to a subset of the set of UEs using a subset of transmit beams included in a channel sensing beam, of the one or more channel sensing beams, after finishing the channel access countdown procedure for the channel sensing beam that includes the subset of transmit beams.

In some aspects, for each of the one or more channel sensing beams, the channel access countdown procedure is performed based at least in part on a respective set of determined channel access parameters including: a contention window size; a randomly selected value; or a defer period.

In some aspects, the method can include determining that a particular subset of the determined set of transmit beams is unavailable based at least in part on performing the channel access countdown procedure for a channel sensing beam that includes the particular subset of transmit beams; switching, based at least in part on the particular subset of transmit beams, to one or more other channel sensing beams, where each of the one or more other channel sensing beams includes one or more of the particular subset of transmit beams; and performing the channel access countdown procedure for each of the one or more other channel sensing beams.

In some aspects, a counter value associated with the channel access countdown procedure for the channel sensing beam that includes the particular subset of transmit beams is reset in association with performing the channel access countdown procedure for at least one of the one or more other channel sensing beams.

In some aspects, a wait time penalty is applied in association with performing the channel access countdown procedure for at least one of the one or more other channel sensing beams.

In some aspects, a counter value associated with the channel access countdown procedure for the channel sensing beam that includes the particular subset of transmit beams is maintained in association with performing the channel access countdown procedure for at least one channel sensing beam of the one or more other channel sensing beams.

In some aspects, the counter value is maintained based at least in part on the at least one channel sensing beam being within a footprint of the channel sensing beam that includes the particular subset of transmit beams.

In some aspects, when performing the channel access countdown procedure for each of the one or more channel sensing beams, channel sensing is performed for at least a minimum sensing duration.

In some aspects, the minimum sensing duration matches a channel reservation signaling periodicity.

Another innovative aspect of the subject matter described in this disclosure can be implemented in an apparatus of a base station for wireless communication. The apparatus station may include a processing system configured to determine a set of UEs to be scheduled in a TxOP; determine a set of transmit beams to be transmitted to the set of UEs; determine, based at least in part on the determined set of transmit beams, one or more channel sensing beams, where each channel sensing beam of the one or more channel sensing beams includes a subset of the determined set of transmit beams; and perform a channel access countdown procedure for each of the one or more channel sensing beams.

Another innovative aspect of the subject matter described in this disclosure can be implemented in a non-transitory computer-readable medium. The non-transitory computer-readable medium may store one or more instructions for wireless communication. The one or more instructions, when executed by one or more processors of a base station, may cause the one or more processors to determine a set of UEs to be scheduled in a TxOP; determine a set of transmit beams to be transmitted to the set of UEs; determine, based at least in part on the determined set of transmit beams, one or more channel sensing beams, where each channel sensing beam of the one or more channel sensing beams includes a subset of the determined set of transmit beams; and perform a channel access countdown procedure for each of the one or more channel sensing beams.

Another innovative aspect of the subject matter described in this disclosure can be implemented in an apparatus for wireless communication. The apparatus may include means for determining a set of UEs to be scheduled in a TxOP; means for determining a set of transmit beams to be transmitted to the set of UEs; means for determining, based at least in part on the determined set of transmit beams, one or more channel sensing beams, where each channel sensing beam of the one or more channel sensing beams includes a subset of the determined set of transmit beams; and means for performing a channel access countdown procedure for each of the one or more channel sensing beams.

Another innovative aspect of the subject matter described in this disclosure can be implemented in a method of wireless communication performed by a base station. The method may include determining a set of transmit beams; determining one or more channel sensing beams, each channel sensing beam including a subset of the determined set of transmit beams; performing a channel access countdown procedure for each of the one or more channel sensing beams; determining, after finishing the channel access countdown procedure for a channel sensing beam, that a particular subset of the determined set of transmit beams is available; and determining, based at least in part on the particular subset of transmit beams, a set of UEs to be scheduled in a TxOP.

In some aspects, the method can include transmitting to the set of UEs using the particular subset of transmit beams.

In some aspects, for each of the one or more channel sensing beams, the channel access countdown procedure is performed based at least in part on a respective set of determined channel access parameters including: a contention window size; a randomly selected value; or a defer period.

In some aspects, the method can include determining that another particular subset of the determined set of transmit beams is unavailable based at least in part on performing the channel access countdown procedure for a channel sensing beam that includes the other particular subset of transmit beams; switching, based at least in part on the other particular subset of transmit beams, to one or more other channel sensing beams, where each of the one or more other channel sensing beams includes one or more of the other particular subset of transmit beams; and performing the channel access countdown procedure for each of the one or more other channel sensing beams.

In some aspects, a counter value associated with the channel access countdown procedure for the channel sensing beam that includes the other particular subset of transmit beams is reset in association with performing the channel access countdown procedure for at least one of the one or more other channel sensing beams.

In some aspects, a wait time penalty is applied in association with performing the channel access countdown procedure for at least one of the one or more other channel sensing beams.

In some aspects, a counter value associated with the channel access countdown procedure for the channel sensing beam that includes the other particular subset of transmit beams is maintained in association with performing the channel access countdown procedure for at least one channel sensing beam of the one or more other channel sensing beams.

In some aspects, the counter value is maintained based at least in part on the at least one channel sensing beam being within a footprint of the channel sensing beam that includes the other particular subset of transmit beams.

In some aspects, when performing the channel access countdown procedure for each of the one or more channel sensing beams, channel sensing is performed for at least a minimum sensing duration.

In some aspects, the minimum sensing duration matches a channel reservation signaling periodicity.

Another innovative aspect of the subject matter described in this disclosure can be implemented in an apparatus of a base station for wireless communication. The apparatus may include a processing system configured to determine a set of transmit beams; determine one or more channel sensing beams, each channel sensing beam including a subset of the determined set of transmit beams; perform a channel access countdown procedure for each of the one or more channel sensing beams; determine, after finishing the channel access countdown procedure for a channel sensing beam, that a particular subset of the determined set of transmit beams is available; and determine, based at least in part on the particular subset of transmit beams, a set of UEs to be scheduled in a TxOP.

Another innovative aspect of the subject matter described in this disclosure can be implemented in a non-transitory computer-readable medium. The non-transitory computer-readable medium may store one or more instructions for wireless communication. The one or more instructions, when executed by one or more processors of a base station, may cause the one or more processors to determine a set of transmit beams; determine one or more channel sensing beams, each channel sensing beam including a subset of the determined set of transmit beams; perform a channel access countdown procedure for each of the one or more channel sensing beams; determine, after finishing the channel access countdown procedure for a channel sensing beam, that a particular subset of the determined set of transmit beams is available; and determine, based at least in part on the particular subset of transmit beams, a set of UEs to be scheduled in a TxOP.

Another innovative aspect of the subject matter described in this disclosure can be implemented in an apparatus for wireless communication. The apparatus may include means for determining a set of transmit beams; means for determining one or more channel sensing beams, each channel sensing beam including a subset of the determined set of transmit beams; means for performing a channel access countdown procedure for each of the one or more channel sensing beams; means for determining, after finishing the channel access countdown procedure for a channel sensing beam, that a particular subset of the determined set of transmit beams is available; and means for determining, based at least in part on the particular subset of transmit beams, a set of UEs to be scheduled in a TxOP.

Aspects generally include a method, apparatus, system, computer program product, non-transitory computer-readable medium, user equipment, base station, wireless communication device, or processing system as substantially described herein with reference to and as illustrated by the accompanying drawings and specification.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

FIGS. 3, 4, 5A and 5B are diagrams illustrating examples associated with transmission countdown and improvements for a beam based channel access procedure.

FIGS. 6 and 7 are diagrams illustrating example processes performed, for example, by a BS.

Like reference numbers and designations in the various drawings indicate like elements.

DETAILED DESCRIPTION

Figure 1:
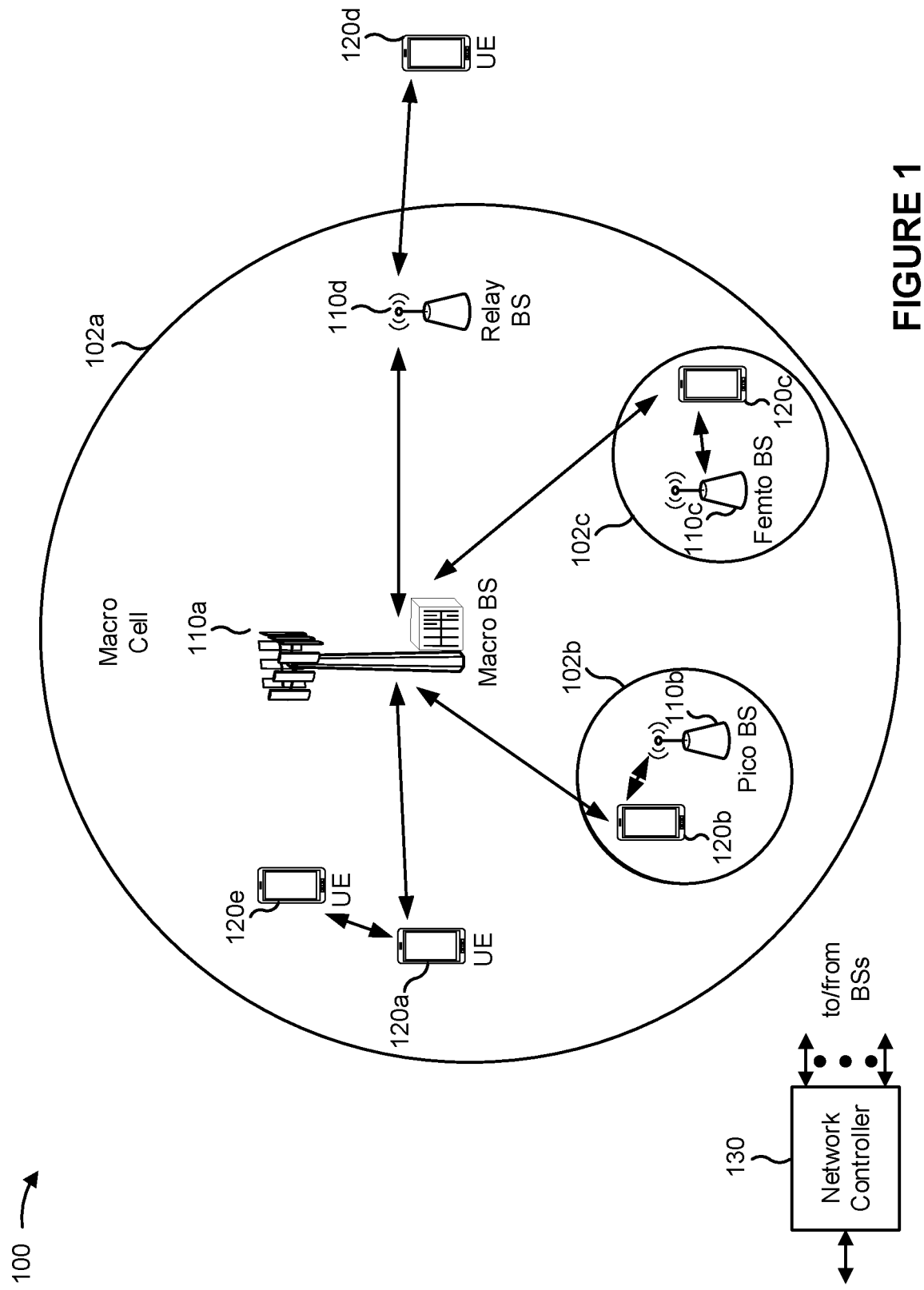
FIG. 1 is a block diagram conceptually illustrating an example of a wireless network.

The following description is directed to certain implementations for the purposes of describing the innovative aspects of this disclosure. However, a person having ordinary skill in the art will readily recognize that the teachings herein can be applied in a multitude of different ways. Some of the examples in this disclosure are based on wireless and wired local area network (LAN) communication according to the Institute of Electrical and Electronics Engineers (IEEE) 802.11 wireless standards, the IEEE 802.3 Ethernet standards, and the IEEE 1901 Powerline communication (PLC) standards. However, the described implementations may be implemented in any device, system or network that is capable of transmitting and receiving radio frequency signals according to any of the wireless communication standards, including any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

In a wireless communication system, such as a 5G (NR) system, spectral sharing can be used (for example, in a millimeter wave (mmW) band), meaning that transmissions can be communicated in different spatial directions on the same band in relatively narrow beams. In association with performing such beam-based directional transmissions, a channel access procedure, such as a listen-before-talk (or listen-before-transmit) (LBT) procedure, associated with determining channel availability, may be used to determine availability of a transmit beam to be used for a given transmission. In some cases, the channel access procedure may assess channel availability using a channel sensing beam. Various aspects of beam-based channel sensing for spectrum sharing may be defined, such as a manner in which to determine a channel sensing beam for a transmit beam, and a manner in which to adjust a transmission parameter, a transmit power, or a channel sensing parameter (for example, an energy detection threshold) in order to achieve fair sensing and transmission, and the like.

However, in some cases, a channel sensing beam may be permitted to include (in other words, encompass) one or more transmit beams. Thus, in some cases, the channel sensing beam may differ from the transmit beam that is to be used for the transmission. In other words, the channel sensing beam may have a different footprint than the transmit beam. Here, a manner in which a channel access countdown procedure is performed, associated with a channel sensing beam that includes multiple transmit beams, needs to be defined. Some aspects described herein provide techniques and apparatus for a beam-based channel access countdown procedure. Notably, the term footprint can in the context of a transmit beam refer to an amount of interference that the beam may cause to one or more nearby receivers. In the context of a receive beam, the term footprint can refer to a sensitivity of the beam to other interferers located near a receiver in a given direction.

Particular implementations of the subject matter described in this disclosure can be implemented to realize one or more of the following potential advantages. In some aspects, the techniques and apparatuses described herein provide a beam-based channel access countdown procedure that may allow a single channel sensing beam, which may include multiple transmit beams, to be utilized in association with determining channel availability for the multiple transmit beams, thereby potentially improving performance of beam-based directional transmissions. The techniques and apparatuses described herein also may provide the further advantage of simplifying the channel access countdown procedure at a base station and making the channel access countdown procedure achievable in association with beam-based directional transmissions. Given that an NR system may multiplex transmissions from different beams (for example, synchronization signal block (SSB), physical downlink shared channel (PDSCH), physical downlink control channel (PDCCH), and channel state information reference signal (CSI-RS) sweeping from the base station side; physical uplink control channel (PUCCH), physical uplink shared channel (PUSCH), and sounding reference signal (SRS) sweeping from the UE side), the beam-based channel access countdown procedure described herein may allow for additional flexibility in the NR system.

FIG. 1 is a block diagram conceptually illustrating an example of a wireless network 100. The wireless network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and also may be referred to as a base station, a NR BS, a Node B, a gNB, a 5G node B (NB), an access point, a transmit receive point (TRP). Each BS may provide communication coverage for a particular geographic area. In 3GPP, the term "cell" can refer to a coverage area of a BS, a BS subsystem serving this coverage area, or a combination thereof, depending on the context in which the term is used.

A BS may provide communication coverage for a macro cell, a pico cell, a femto cell, another type of cell, or a combination thereof. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (for example, three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another as well as to one or more other BSs or network nodes (not shown) in the wireless network 100 through various types of backhaul interfaces, such as a direct physical connection, a virtual network, or a combination thereof using any suitable transport network.

Wireless network 100 also may include relay stations. A relay station is an entity that can receive a transmission of data from an upstream station (for example, a BS or a UE) and send a transmission of the data to a downstream station (for example, a UE or a BS). A relay station also may be a UE that can relay transmissions for other UEs. In the example shown in FIG. 1, a relay station 110d may communicate with macro BS 110a and a UE 120d in order to facilitate communication between BS 110a and UE 120d. A relay station also may be referred to as a relay BS, a relay base station, a relay, etc.

Wireless network 100 may be a heterogeneous network that includes BSs of different types, for example, macro BSs, pico BSs, femto BSs, relay BSs, etc. These different types of BSs may have different transmit power levels, different coverage areas, and different impacts on interference in wireless network 100. For example, macro BSs may have a high transmit power level (for example, 5 to 40 Watts) whereas pico BSs, femto BSs, and relay BSs may have lower transmit power levels (for example, 0.1 to 2 Watts).

A network controller 130 may couple to a set of BSs and may provide coordination and control for these BSs. Network controller 130 may communicate with the BSs via a backhaul. The BSs also may communicate with one another, for example, directly or indirectly via a wireless or wireline backhaul.

UEs 120 (for example, 120a, 120b, 120c) may be dispersed throughout wireless network 100, and each UE may be stationary or mobile. A UE also may be referred to as an access terminal, a terminal, a mobile station, a subscriber unit, a station, etc. A UE may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, etc., that may communicate with a base station, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices or may be implemented as NB-IoT (narrowband internet of things) devices. Some UEs may be considered a Customer Premises Equipment (CPE). UE 120 may be included inside a housing that houses components of UE 120, such as processor components, memory components, similar components, or a combination thereof.

In general, any number of wireless networks may be deployed in a given geographic area. Each wireless network may support a particular RAT and may operate on one or more frequencies. A RAT also may be referred to as a radio technology, an air interface, etc. A frequency also may be referred to as a carrier, a frequency channel, etc. Each frequency may support a single RAT in a given geographic area in order to avoid interference between wireless networks of different RATs. In some cases, NR or 5G RAT networks may be deployed.

In some examples, access to the air interface may be scheduled, where a scheduling entity (for example, a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (for example, one or more other UEs). In this example, the UE is functioning as a scheduling entity, and other UEs utilize resources scheduled by the UE for wireless communication. A UE may function as a scheduling entity in a peer-to-peer (P2P) network, in a mesh network, or another type of network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

In some aspects, two or more UEs 120 (for example, shown as UE 120a and UE 120e) may communicate directly using one or more sidelink channels (for example, without using a base station 110 as an intermediary to communicate with one another). For example, the UEs 120 may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or similar protocol), a mesh network, or similar networks, or combinations thereof. In this case, the UE 120 may perform scheduling operations, resource selection operations, as well as other operations described elsewhere herein as being performed by the base station 110.

Figure 2:
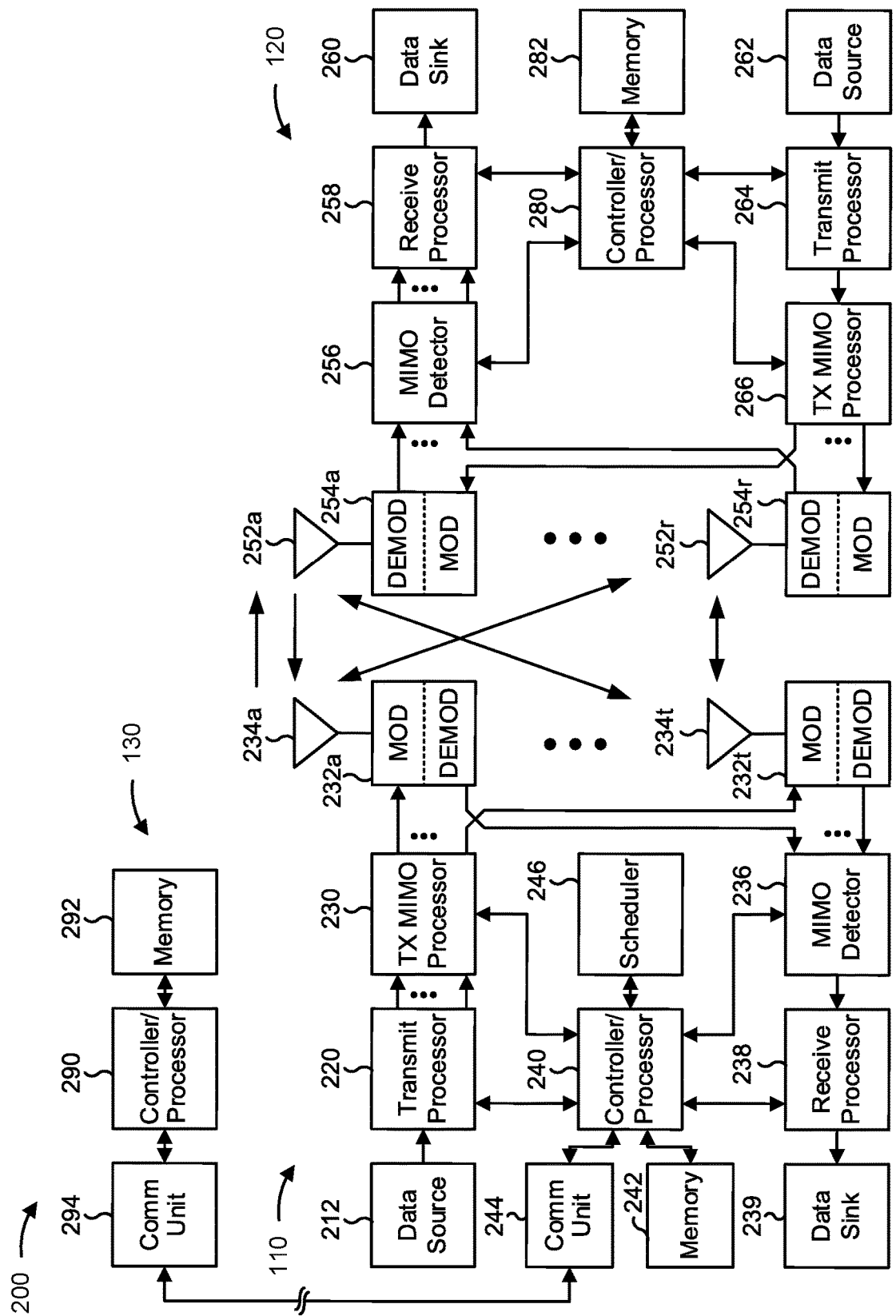
FIG. 2 is a block diagram conceptually illustrating an example of a base station (BS) in communication with a user equipment (UE) in a wireless network.

FIG. 2 is a block diagram conceptually illustrating an example 200 of a base station (BS) 110 in communication with a UE 120. In some aspects, base station 110 and UE 120 may respectively be one of the base stations and one of the UEs in wireless network 100 of FIG. 1. The base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (for example, encode and modulate) the data for each UE based at least in part on the MCS(s) selected for the UE, and provide data symbols for all UEs. The transmit processor 220 also may process system information (for example, for semi-static resource partitioning information (SRPI), etc.) and control information (for example, CQI requests, grants, upper layer signaling, etc.) and provide overhead symbols and control symbols. The transmit processor 220 also may generate reference symbols for reference signals (for example, the cell-specific reference signal (CRS)) and synchronization signals (for example, the primary synchronization signal (PSS) and secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide T output symbol streams to T modulators (MODs) 232a through 232t. Each modulator 232 may process a respective output symbol stream (for example, for OFDM, etc.) to obtain an output sample stream. Each modulator 232 may further process (for example, convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 or other base stations and may provide received signals to demodulators (DEMODs) 254a through 254r, respectively. Each demodulator 254 may condition (for example, filter, amplify, downconvert, and digitize) a received signal to obtain input samples. Each demodulator 254 may further process the input samples (for example, for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (for example, demodulate and decode) the detected symbols, provide decoded data for UE 120 to a data sink 260, and provide decoded control information and system information to a controller or processor (controller/processor) 280. A channel processor may determine reference signal received power (RSRP), received signal strength indicator (RSSI), reference signal received quality (RSRQ), channel quality indicator (CQI), etc. In some aspects, one or more components of UE 120 may be included in a housing.

On the uplink, at UE 120, a transmit processor 264 may receive and process data from a data source 262 and control information (for example, for reports including RSRP, RSSI, RSRQ, CQI, etc.) from controller/processor 280. Transmit processor 264 also may generate reference symbols for one or more reference signals. The symbols from transmit processor 264 may be precoded by a TX MIMO processor 266 if applicable, further processed by modulators 254a through 254r (for example, for DFT-s-OFDM, CP-OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to a controller or processor (i.e., controller/processor) 240. The base station 110 may include communication unit 244 and communicate to network controller 130 via communication unit 244. The network controller 130 may include communication unit 294, a controller or processor (i.e., controller/processor) 290, and memory 292.

The controller/processor 240 of base station 110, the controller/processor 280 of UE 120, or any other component(s) of FIG. 2 may perform one or more techniques associated with transmission countdown and improvements for a beam based channel access procedure, as described in more detail elsewhere herein. For example, the controller/processor 240 of base station 110, the controller/processor 280 of UE 120, or any other component(s) (or combinations of components) of FIG. 2 may perform or direct operations of, for example, the process 600 of FIG. 6, the process 700 of FIG. 7, or other processes as described herein. The memories 242 and 282 may store data and program codes for base station 110 and UE 120, respectively. A scheduler 246 may schedule UEs for data transmission on the downlink, the uplink, or a combination thereof.

Figure 6:
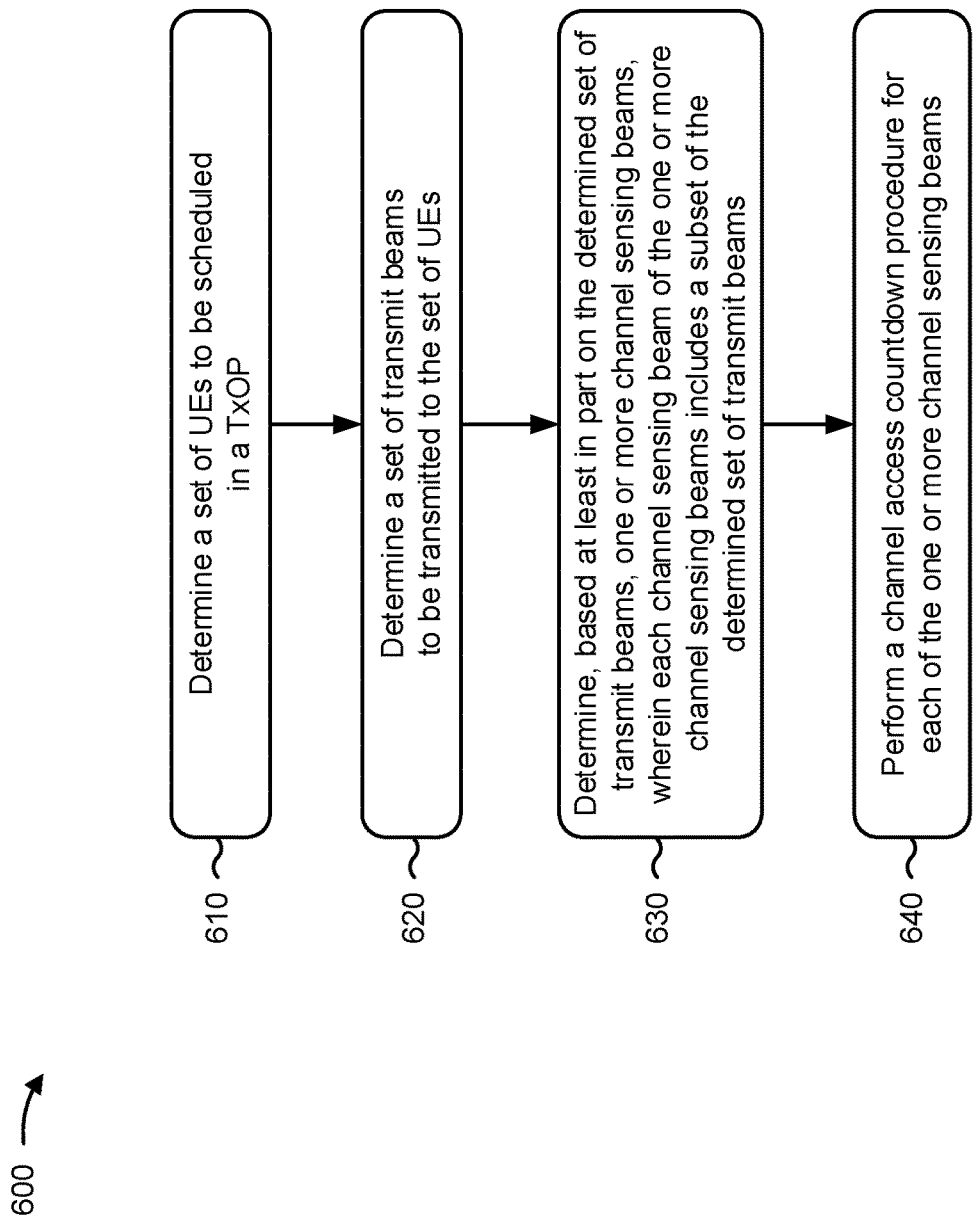

The stored program codes, when executed by the controller/processor 240 or other processors and modules at base station 110, may cause the base station 110 to perform operations described with respect to the process 600 of FIG. 6, the process 700 of FIG. 7, or other processes as described herein. A scheduler 246 may schedule UEs for data transmission on the downlink, the uplink, or a combination thereof.

The base station 110 may include means for performing one or more operations described herein, such as the process 600 of FIG. 6, the process 700 of FIG. 7, or other processes as described herein. In some aspects, such means may include one or more components of base station 110 described in connection with FIG. 2.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, the TX MIMO processor 266, or another processor may be performed by or under the control of controller/processor 280.

In some implementations, the controller/processor 240 may be a component of a processing system. A processing system may generally refer to a system or series of machines or components that receives inputs and processes the inputs to produce a set of outputs (which may be passed to other systems or components of, for example, the base station 110). For example, a processing system of the base station 110 may refer to a system including the various other components or subcomponents of the base station 110.

The processing system of the base station 110 may interface with other components of the base station 110, and may process information received from other components (such as inputs or signals), output information to other components, etc. For example, a chip or modem of the base station 110 may include a processing system, a first interface to receive or obtain information, and a second interface to output, transmit or provide information. In some cases, the first interface may refer to an interface between the processing system of the chip or modem and a receiver, such that the base station 110 may receive information or signal inputs, and the information may be passed to the processing system. In some cases, the second interface may refer to an interface between the processing system of the chip or modem and a transmitter, such that the base station 110 may transmit information output from the chip or modem. A person having ordinary skill in the art will readily recognize that the second interface also may obtain or receive information or signal inputs, and the first interface also may output, transmit or provide information.

Figure 3:
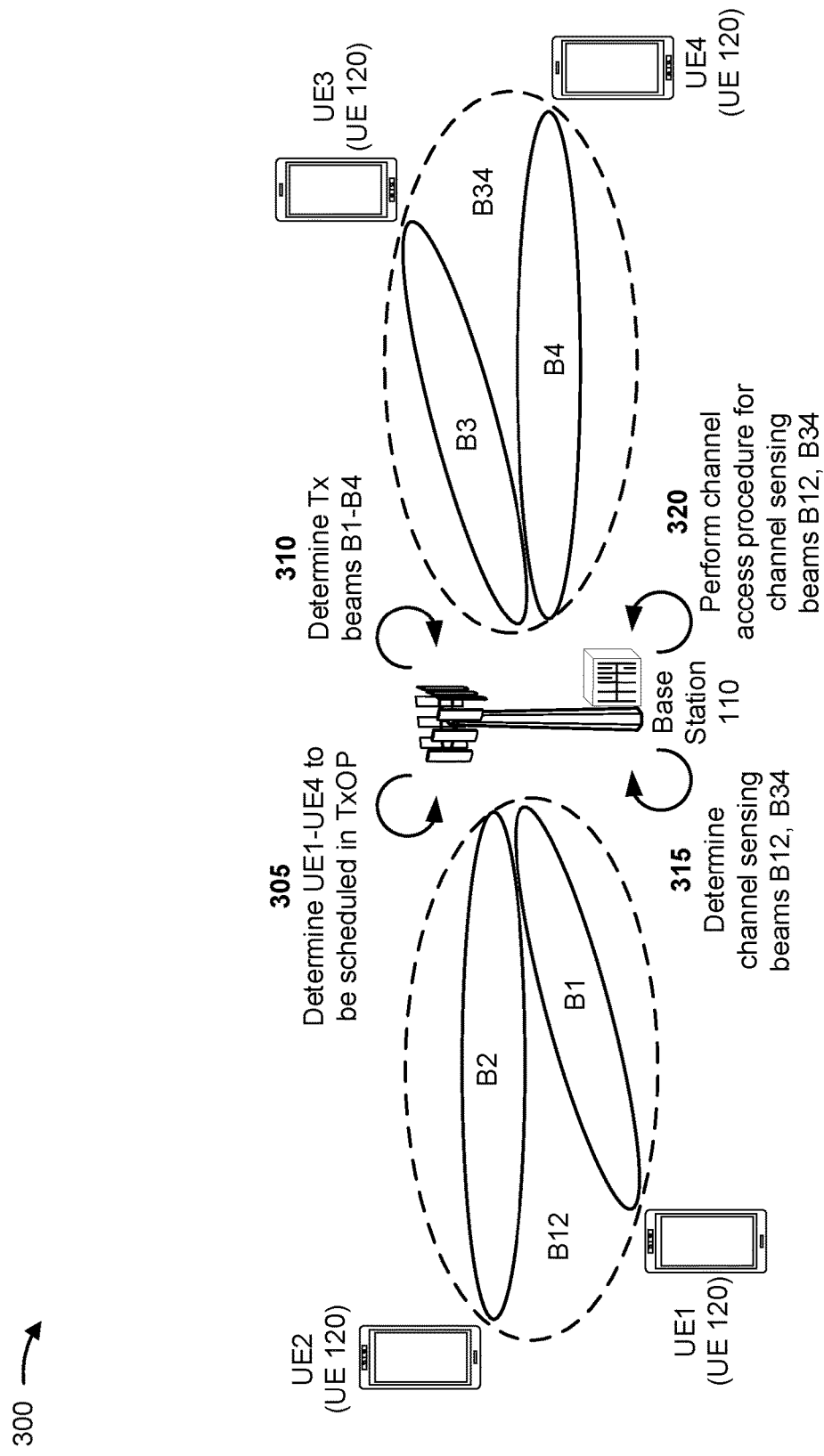
Figure 4:
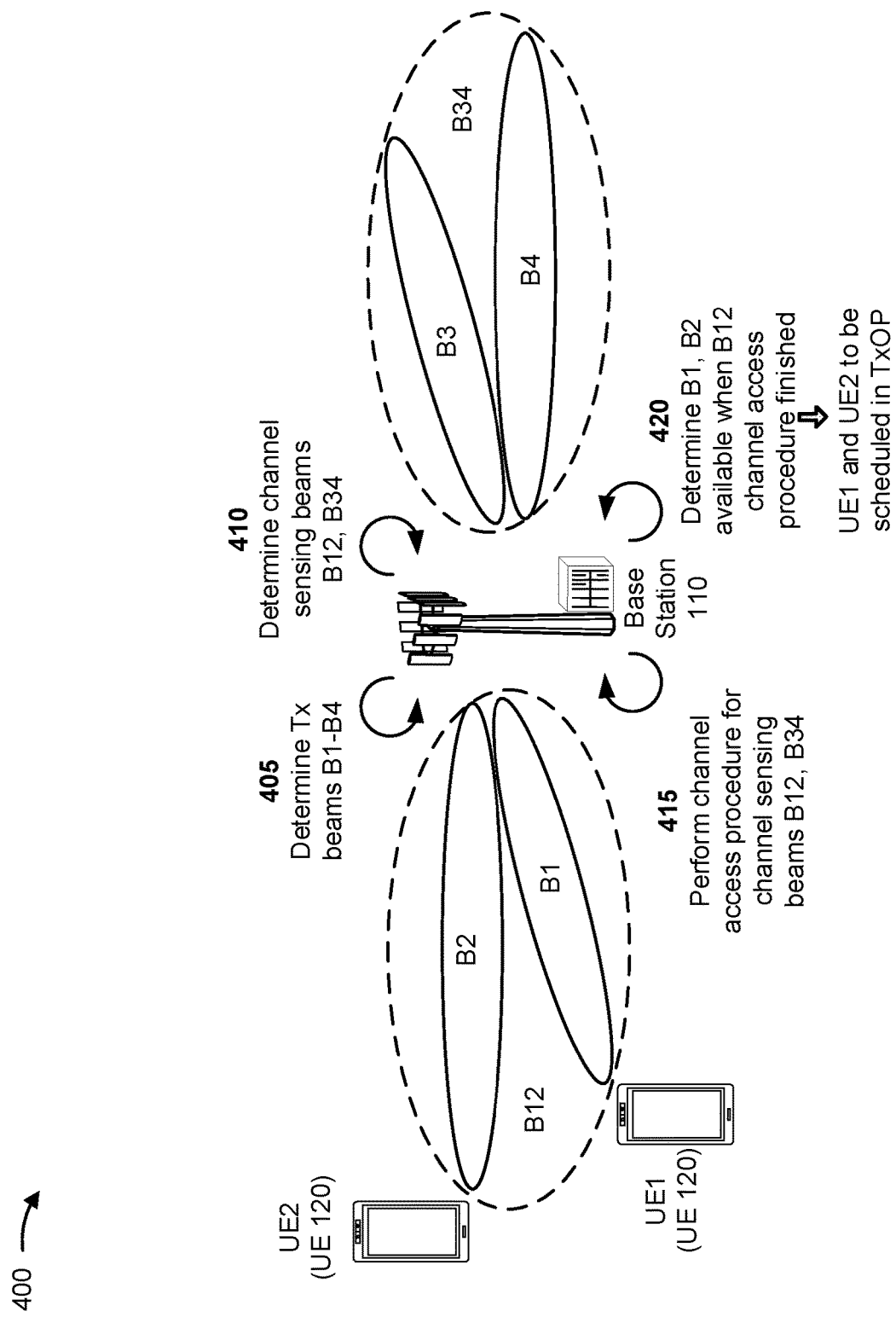

FIGS. 3 and 4 are diagrams illustrating examples associated with transmission countdown and improvements for a beam based channel access procedure.

FIG. 3 is a diagram illustrating an example 300 in which UE scheduling is followed by performing a channel access countdown procedure for one or more channel sensing beams.

As shown by reference number 305 in FIG. 3, in some aspects, a base station 110 (such as the base station 110 depicted and described in FIGS. 1 and 2) may determine a set of UEs 120 (UE1-UE4, such as one or more of the UEs 120 depicted and described in FIGS. 1 and 2) to be scheduled in a transmission opportunity (TxOP). For example, as shown in FIG. 3, the base station may determine a set of UEs including UE1, UE2, UE3 and UE4 to be scheduled in a TxOP.

As shown by reference number 310, the base station may determine a set of transmit beams to be transmitted to the set of UEs. For example, as shown in FIG. 3, the base station may determine a transmit beam B1 to be transmitted to UE1, a transmit beam B2 that is to be transmitted to UE2, a transmit beam B3 to be transmitted to UE3, and a transmit beam B4 to be transmitted to UE4.

As shown by reference number 315, the base station may determine, based at least in part on the determined set of transmit beams, one or more channel sensing beams (sometimes referred to as one or more composite beams). In some aspects, a channel sensing beam is a beam to be used in association with determining whether a channel associated with one or more transmit beams included in the channel sensing beam is available (for example, such that the base station can transmit using the one or more transmit beams). In some aspects, each of the one or more channel sensing beams may include (for example, spatially encompass) a subset of the determined set of transmit beams. That is, each of the one or more channel sensing beams may have a footprint that overlaps the footprints of the subset of the determined set of transmit beams. As noted above, the term footprint can in the context of a transmit beam refer to interference that a beam may cause to one or more nearby receivers.

For example, as shown in FIG. 3, the base station may determine a channel sensing beam B12 that includes transmit beam B1 and transmit beam B2, and a channel sensing beam B34 that includes transmit beam B3 and transmit beam B4.

As shown by reference number 320, the base station may perform a channel access countdown procedure for each of the one or more channel sensing beams. For example, the base station may perform a channel access countdown procedure for channel sensing beam B12 and may (separately) perform a channel access countdown procedure for channel sensing beam B34.

In some aspects, for a given channel sensing beam, the base station may perform the channel access countdown procedure based at least in part on a respective set of channel access parameters determined by the base station. The set of channel access parameters may include, for example, a contention window (CW) size, a randomly selected value N, and a defer period. In some aspects, the base station may determine the CW size based at least in part on, for example, a success/failure of one or more previous transmissions or a type of traffic to be transmitted. In some aspects, the base station may determine the randomly selected value as, for example, a randomly selected value in a range from 0 to the CW size. In some aspects, the base station may determine the defer or deferment period based at least in part on a technology specific parameter, a countdown increment (for example, one slot of X microseconds (µs)), or a type of traffic to be transmitted.

In some aspects, when performing the channel access countdown procedure, the base station may count down a counter value from the randomly selected value N to a value of zero. In some aspects, the base station may start the countdown when the channel, associated with the channel sensing beam, is idle for a length of time equal to the defer period. Here, after the channel is idle for the length of the defer period, the base station may decrement the counter value at each interval of time (for example, at each slot of X μs) during which the channel is sensed as available. If during the channel access countdown procedure the channel is sensed as busy, the base station may freeze the counter value, wait until the channel is sensed as free for another defer period, and continue the countdown. In some aspects, the base station may transmit a transmission after the counter value reaches zero. In some aspects, the base station may separately perform the channel access countdown procedure for each of the one or more channel sensing beams.

In some aspects, the base station may transmit to a subset of the set of UEs using a subset of transmit beams included in a channel sensing beam, of the one or more channel sensing beams, after finishing the channel access countdown procedure for the channel sensing beam that includes the subset of transmit beams. For example, the base station may finish the channel access countdown procedure for the channel sensing beam B12 (such as when the counter value for the channel access countdown procedure associated with the channel sensing beam B12 reaches zero), and may transmit to UE1 and UE2 using transmit beams B1 and B2, respectively. Similarly, the base station may finish the channel access countdown procedure for the channel sensing beam B34 (for example, when the counter value for the channel access countdown procedure associated with the channel sensing beam B34 reaches zero, which may be at a different time than the base station finishes the channel access countdown procedure for the channel sensing beam B12) and may transmit to UE3 and UE4 using transmit beams B3 and B4, respectively.

FIG. 4 is a diagram illustrating an example 400 in which UE scheduling is performed after performing a channel access countdown procedure for one or more channel sensing beams.

As shown by reference number 405 in FIG. 4, a base station 110 (such as the base station 110 depicted and described in FIGS. 1 and 2) may determine a set of transmit beams (for example, a set of transmit beams for which availability is to be determined). For example, as shown in FIG. 4, the base station may determine a transmit beam B1, a transmit beam B2, a transmit beam B3, and a transmit beam B4 for which availability is to be determined.

As shown by reference number 410, the base station may determine, based at least in part on the determined set of transmit beams, one or more channel sensing beams. In some aspects, a channel sensing beam is a beam to be used in association with determining whether a channel associated with one or more transmit beams included in the channel sensing beam, is available (for example, such that the base station can transmit using the one or more transmit beams). In some aspects, each of the one or more channel sensing beams may include (for example, spatially encompass) a subset of the determined set of transmit beams. That is, each of the one or more channel sensing beams may have footprint that overlaps the footprints of the subset of the determined set of transmit beams. As noted above, the term footprint can in the context of a transmit beam refer to interference that a beam may cause to one or more nearby receivers. For example, as shown in FIG. 4, the base station may determine a channel sensing beam B12 that includes transmit beam B1 and transmit beam B2, and a channel sensing beam B34 that includes transmit beam B3 and transmit beam B4.

As shown by reference number 415, the base station may perform a channel access countdown procedure for each of the one or more channel sensing beams. For example, the base station may perform a channel access countdown procedure for channel sensing beam B12 and may (separately) perform a channel access countdown procedure for channel sensing beam B34. In some aspects, the base station may perform the channel access procedure for a given channel sensing beam in a manner similar to that described in association with FIG. 3.

As shown by reference number 420, the base station may determine, after finishing the channel access countdown procedure for a channel sensing beam, that a particular subset of the determined set of transmit beams is available. For example, after finishing the channel access countdown procedure for the channel sensing beam B12 (such as when a counter value associated with the channel access procedure for the channel sensing beam B12 reaches zero), the base station may determine that transmit beams B1 and B2 are available.

As further shown by reference number 420, the base station may determine, based at least in part on the particular subset of transmit beams, a set of UEs (UE1 and UE2, such as one or more of the UEs 120 depicted and described in FIGS. 1 and 2) to be scheduled in a TxOP. For example, as shown in FIG. 4, the base station may determine, based at least in part on transmit beams B1 and B2, a set of UEs including UE1 and UE2 to be scheduled in a TxOP. In some aspects, the set of UEs may include UEs to which the base station can transmit the subset of transmit beams. For example, the base station may determine that transmit beam B1 is to be transmitted to UE1, and that transmit beam B2 is to be transmitted to UE2, and may determine the set of UEs to include UE1 and UE2, accordingly.

In some aspects, the base station may transmit to the set of UEs using the subset of the transmit beams. For example, the base station may transmit to UE1 and UE2 using transmit beams B1 and B2, respectively, based at least in part on determining that the transmit beams B1 and B2 are available.

In some aspects, in either of the scenarios described in association with FIG. 3 and FIG. 4, the base station may iterate between performing the channel access countdown procedure and UE scheduling. For example, the base station may determine a set of transmit beams, and one or more channel sensing beams. The base station may perform the channel access procedure for the one or more channel sensing beams. However, in some cases, the base station may determine that a subset of the determined set of transmit beams is unavailable, based at least in part on performing the channel access countdown procedure for a channel sensing beam that includes the subset of transmit beams. For example, the base station may determine that a subset of the determined set of transmit beams is unavailable based at least in part on detecting that the channel, associated with the channel sensing beam that includes the subset of transmit beams, is busy for a threshold period of time, based at least in part on an indication received by the base station. In such a case, the base station may switch beams or UEs, and may restart the channel access countdown procedure. For example, the base station may switch to one or more other channel sensing beams, where each of the one or more other channel sensing beams includes one or more of the subset of transmit beams, and may perform the channel access countdown procedure for each of the one or more other channel sensing beams in a manner similar to that described throughout. In some aspects, alignment between the one or more other channel sensing beams can be achieved through self-deferral (in other words, the base station may wait until the counter value associated with each of the one or more other channel sensing beam reaches zero before transmitting using any of the subset of transmit beams).

Figure 5A:
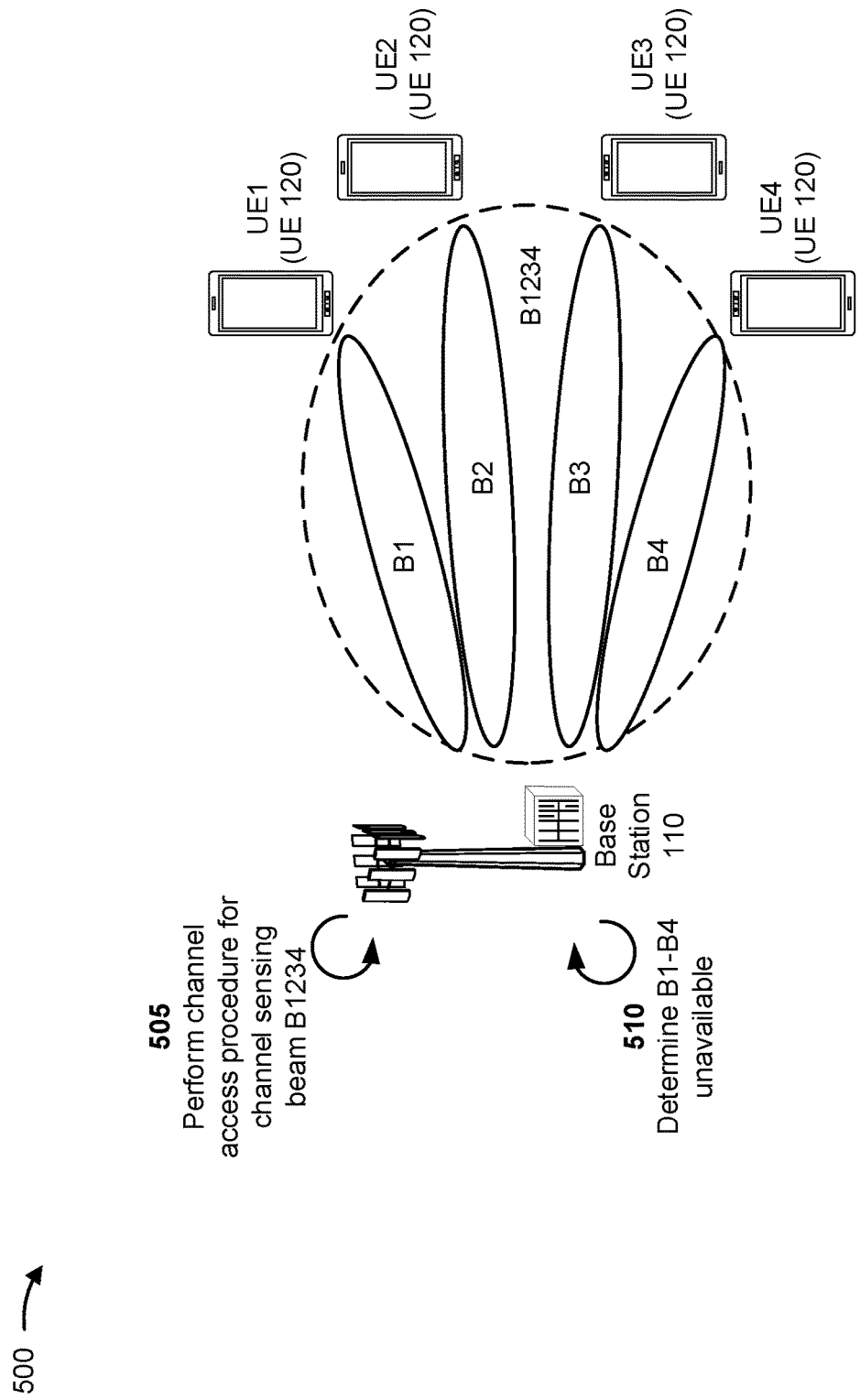

FIGS. 5A and 5B illustrate examples 500 of a base station switching channel sensing beams and restarting the channel access countdown procedure based at least in part on determining that a subset of transmit beams is unavailable.

In FIG. 5A, the base station determines a set of transmit beams including transmit beam B1, transmit beam B2, transmit beam B3, and transmit beam B4. Further, the base station determines a channel sensing beam B1234 that includes transmit beams B1 through B4. As shown by reference number 505 in FIG. 5A, the base station may perform the channel access countdown procedure for the channel sensing beam B1234. However, as shown by reference number 510, the base station may determine that the determined set of transmit beams B1 through B4 is unavailable based at least in part on performing the channel access countdown procedure for the channel sensing beam B1234 (for example, based at least in part on detecting that the channel, associated with the channel sensing beam B1234 is busy for a threshold period of time).

As shown by reference number 515 in FIG. 5B, the base station may switch to a channel sensing beams B12 (including transmit beams B1 and B2) and a channel sensing beam B34 (including transmit beams B3 and B4). As shown by reference number 520 in FIG. 5B, the base station may restart the channel access countdown procedure for channel sensing beams B12 and B34.

In addition to the described examples, switching channel sensing beams during the channel access countdown procedure may be desirable in some scenarios (for example, when additional data is to be transmitted, when a priority of the traffic changes). Thus, in some aspects, the base station may abandon an ongoing channel access countdown procedure, switch to another channel sensing beam, and start a new channel access countdown procedure. In some aspects, such as when the base station switches to another channel sensing beam, the base station may reset a counter value when performing the channel access countdown procedure. For example, when the base station switches from one channel sensing beam that includes a subset of a set of transmit beams, to one or more other channel sensing beams, each including at least one of the subset of the transmit beams, the base station may reset a counter value when performing the channel access countdown procedure for a given one of the one or more other channel sensing beams. In some aspects, the base station may apply a wait time penalty in association with performing the channel access countdown procedure for the other channel sensing beam. In some aspects, the base station may assess the wait time penalty in order to ensure fairness when switching to another channel sensing beam (for example, such that the base station does not gain an unfair channel access advantage by switching to the other channel sensing beam).

Alternatively, in some aspects, when the base station switches to another channel sensing beam, the base station may maintain a counter value when performing the channel access countdown procedure. For example, when the base station switches from one channel sensing beam that includes a subset of a set of transmit beams, to one or more other channel sensing beams, each including at least one of the subset of the transmit beams as described throughout, the base station may maintain the counter value when performing the channel access countdown procedure for a given one of the one or more other channel sensing beams. In some aspects, the base station may maintain the counter value for a given one of the one or more other channel sensing beams based at least in part on the given channel sensing beam being within a footprint of the channel sensing beam that includes the subset of transmit beams.

In some aspects, when performing the channel access countdown procedure for each of the one or more channel sensing beams, the base station may be configured to perform channel sensing for at least a minimum sensing duration. In some aspects, the minimum sensing duration may match a channel reservation signaling periodicity. Such an aspect may be used when, for example, a reservation signal/message is to be repeated at a particular interval of time (such as once every X slots/microseconds (µs)). Here, the minimum sensing duration may be at least a minimum amount of time (for example, X slots/µs) before a transmission. In some aspects, the minimum sensing duration restriction may be applied when the base station switches channel sensing beams (for example, after a given TxOP).

FIG. 6 is a diagram illustrating an example process 600 performed, for example, by a BS. The example process 600 shows where a base station 110 (such as the base station 110 depicted and described in FIGS. 1 and 2) performs operations associated with transmission countdown and improvements for a beam based channel access procedure.

As shown in FIG. 6, in some aspects, the process 600 may include determining a set of UEs to be scheduled in a TxOP (block 610). For example, the base station 110 (such as by using transmit processor 220, receive processor 238, controller/processor 240, memory 242) may determine a set of UEs 120 (such as one or more of the UEs 120 depicted and described in FIGS. 1 and 2) to be scheduled in a TxOP.

As further shown in FIG. 6, in some aspects, the process 600 may include determining a set of transmit beams to be transmitted to the set of UEs (block 620). For example, the base station 110 (such as by using transmit processor 220, receive processor 238, controller/processor 240, memory 242) may determine a set of transmit beams to be transmitted to the set of UEs.

As further shown in FIG. 6, in some aspects, the process 600 may include determining, based at least in part on the determined set of transmit beams, one or more channel sensing beams (block 630). For example, the base station 110 (such as by using transmit processor 220, receive processor 238, controller/processor 240, memory 242) may determine, based at least in part on the determined set of transmit beams, one or more channel sensing beams. In some aspects, each channel sensing beam of the one or more channel sensing beams includes a subset of the determined set of transmit beams.

As further shown in FIG. 6, in some aspects, the process 600 may include performing a channel access countdown procedure for each of the one or more channel sensing beams (block 640). For example, the base station 110 (such as by using transmit processor 220, receive processor 238, controller/processor 240, memory 242) may perform a channel access countdown procedure for each of the one or more channel sensing beams.

The process 600 may include additional aspects, such as any single aspect or any combination of aspects described below or in connection with one or more other processes described elsewhere herein.

In a first aspect, the base station may transmit to a subset of the set of UEs using a subset of transmit beams included in a channel sensing beam, of the one or more channel sensing beams, after finishing the channel access countdown procedure for the channel sensing beam that includes the subset of transmit beams.

In a second aspect, alone or in combination with the first aspect, for each of the one or more channel sensing beams, the channel access countdown procedure is performed based at least in part on a respective set of determined channel access parameters including: a contention window size; a randomly selected value; or a defer period.

In a third aspect, alone or in combination with one or more of the first and second aspects, the base station may determine that a particular subset of the determined set of transmit beams is unavailable based at least in part on performing the channel access countdown procedure for a channel sensing beam that includes the particular subset of transmit beams. Here, the base station may switch, based at least in part on the particular subset of transmit beams, to one or more other channel sensing beams. In some aspects, each of the one or more other channel sensing beams includes one or more of the particular subset of transmit beams. The base station may perform the channel access countdown procedure for each of the one or more other channel sensing beams.

In a fourth aspect, alone or in combination with one or more of the first through third aspects, a counter value associated with the channel access countdown procedure for the channel sensing beam that includes the particular subset of transmit beams is reset in association with performing the channel access countdown procedure for at least one of the one or more other channel sensing beams.

In a fifth aspect, alone or in combination with one or more of the first through fourth aspects, a wait time penalty is applied in association with performing the channel access countdown procedure for at least one of the one or more other channel sensing beams.

In a sixth aspect, alone or in combination with one or more of the first through fifth aspects, a counter value associated with the channel access countdown procedure for the channel sensing beam that includes the particular subset of transmit beams is maintained in association with performing the channel access countdown procedure for at least one channel sensing beam of the one or more other channel sensing beams.

In a seventh aspect, alone or in combination with one or more of the first through sixth aspects, the counter value is maintained based at least in part on the at least one channel sensing beam being within a footprint of the channel sensing beam that includes the particular subset of transmit beams.

In an eighth aspect, alone or in combination with one or more of the first through seventh aspects, when performing the channel access countdown procedure for each of the one or more channel sensing beams, channel sensing is performed for at least a minimum sensing duration.

In a ninth aspect, alone or in combination with one or more of the first through eighth aspects, the minimum sensing duration matches a channel reservation signaling periodicity.

Although FIG. 6 shows example blocks of the process 600, in some aspects, the process 600 may include additional blocks, fewer blocks, different blocks, or differently arranged blocks than those depicted in FIG. 6. Additionally, or alternatively, two or more of the blocks of the process 600 may be performed in parallel.

FIG. 7 is a diagram illustrating an example process 700 performed, for example, by a BS. The example process 700 shows where a base station 110 (such as the base station 110 depicted and described in FIGS. 1 and 2) performs operations associated with transmission countdown and improvements for a beam based channel access procedure.

As shown in FIG. 7, in some aspects, the process 700 may include determining a set of transmit beams (block 710). For example, the base station 110 (such as by using transmit processor 220, receive processor 238, controller/processor 240, memory 242) may determine a set of transmit beams.

As further shown in FIG. 7, in some aspects, the process 700 may include determining one or more channel sensing beams, each channel sensing beam including a subset of the determined set of transmit beams (block 720). For example, the base station 110 (such as by using transmit processor 220, receive processor 238, controller/processor 240, memory 242) may determine one or more channel sensing beams, each channel sensing beam including a subset of the determined set of transmit beams.

As further shown in FIG. 7, in some aspects, the process 700 may include performing a channel access countdown procedure for each of the one or more channel sensing beams (block 730). For example, the base station 110 (such as by using transmit processor 220, receive processor 238, controller/processor 240, memory 242) may perform a channel access countdown procedure for each of the one or more channel sensing beams.

As further shown in FIG. 7, in some aspects, the process 700 may include determining, after finishing the channel access countdown procedure for a channel sensing beam, that a particular subset of the determined set of transmit beams is available (block 740). For example, the base station 110 (such as by using transmit processor 220, receive processor 238, controller/processor 240, memory 242) may determine, after finishing the channel access countdown procedure for a channel sensing beam, that a particular subset of the determined set of transmit beams is available.

As further shown in FIG. 7, in some aspects, the process 700 may include determining, based at least in part on the particular subset of transmit beams, a set of UEs 120 (such one or more of the UEs 120 depicted and described in FIGS. 1 and 2) to be scheduled in a TxOP (block 750). For example, the base station (110 for example, using transmit processor 220, receive processor 238, controller/processor 240, memory 242) may determine, based at least in part on the particular subset of transmit beams, a set of UEs to be scheduled in a TxOP.

The process 700 may include additional aspects, such as any single aspect or any combination of aspects described below or in connection with one or more other processes described elsewhere herein.

In a first aspect, the base station may transmit to the set of UEs using the particular subset of transmit beams.

In a second aspect, alone or in combination with the first aspect, for each of the one or more channel sensing beams, the channel access countdown procedure is performed based at least in part on a respective set of determined channel access parameters including: a contention window size; a randomly selected value; or a defer period.

In a third aspect, alone or in combination with one or more of the first and second aspects, the base station may determine that another particular subset of the determined set of transmit beams is unavailable based at least in part on performing the channel access countdown procedure for a channel sensing beam that includes the other particular subset of transmit beams. Here, the base station may switch, based at least in part on the other particular subset of transmit beams, to one or more other channel sensing beams. In some aspects, each of the one or more other channel sensing beams includes one or more of the other particular subset of transmit beams. The base station may perform the channel access countdown procedure for each of the one or more other channel sensing beams.

In a fourth aspect, alone or in combination with one or more of the first through third aspects, a counter value associated with the channel access countdown procedure for the channel sensing beam that includes the other particular subset of transmit beams is reset in association with performing the channel access countdown procedure for at least one of the one or more other channel sensing beams.

In a fifth aspect, alone or in combination with one or more of the first through fourth aspects, a wait time penalty is applied in association with performing the channel access countdown procedure for at least one of the one or more other channel sensing beams.

In a sixth aspect, alone or in combination with one or more of the first through fifth aspects, a counter value associated with the channel access countdown procedure for the channel sensing beam that includes the other particular subset of transmit beams is maintained in association with performing the channel access countdown procedure for at least one channel sensing beam of the one or more other channel sensing beams.

In a seventh aspect, alone or in combination with one or more of the first through sixth aspects, the counter value is maintained based at least in part on the at least one channel sensing beam being within a footprint of the channel sensing beam that includes the other particular subset of transmit beams.

In an eighth aspect, alone or in combination with one or more of the first through seventh aspects, when performing the channel access countdown procedure for each of the one or more channel sensing beams, channel sensing is performed for at least a minimum sensing duration.

In a ninth aspect, alone or in combination with one or more of the first through eighth aspects, the minimum sensing duration matches a channel reservation signaling periodicity.

Although FIG. 7 shows example blocks of the process 700, in some aspects, the process 700 may include additional blocks, fewer blocks, different blocks, or differently arranged blocks than those depicted in FIG. 7. Additionally, or alternatively, two or more of the blocks of the process 700 may be performed in parallel.

The foregoing disclosure provides illustration and description, but is not intended to be exhaustive or to limit the aspects to the precise form disclosed. Modifications and variations may be made in light of the disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software. As used herein, the phrase "based on" is intended to be broadly construed to mean "based at least in part on."

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the aspects disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some aspects, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Aspects of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the aspects described in this disclosure may be readily apparent to those skilled in the art, and the generic principles defined herein may be applied to other aspects without departing from the spirit or scope of this disclosure. Thus, the claims are not intended to be limited to the aspects shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate aspects also can be implemented in combination in a single aspect. Conversely, various features that are described in the context of a single aspect also can be implemented in multiple aspects separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Additionally, other aspects are within the scope of the following claims. In some cases, the actions recited in the claims can be performed in a different order and still achieve desirable results.

What is claimed is:

1. A method of wireless communication performed at a base station, comprising:
    performing a channel access countdown procedure for each of one or more channel sensing beams, wherein a channel sensing beam, of the one or more channel sensing beams, includes multiple transmit beams;
    determining whether a channel, associated with the multiple transmit beams, is available by using the channel sensing beam; and
    outputting information, for transmission via the multiple transmit beams to one or more user equipment (UEs), if the channel is available.

2. The method of claim 1, wherein outputting the information outputting the information after performing the channel access countdown procedure.

3. The method of claim 1, wherein the channel access countdown procedure is performed based at least in part on a respective set of one or more channel access parameters that include at least one of:
    a contention window size;
    a randomly selected value; or
    a defer period.

4. The method of claim 1, further comprising:
    performing the channel access countdown procedure for a particular channel sensing beam that includes a particular subset of transmit beams unavailable for wireless communication, wherein the particular subset of transmit beams includes the multiple transmit beams; and
    switching, after performing the channel access countdown procedure for the particular channel sensing beam, from the particular channel sensing beam to the one or more channel sensing beams.

5. The method of claim 4, further comprising:
    resetting a counter value associated with the channel access countdown procedure for the particular channel sensing beam.

6. The method of claim 4, further comprising:
    maintaining a counter value associated with the channel access countdown procedure for the particular channel sensing beam.

7. The method of claim 6, wherein the counter value is maintained based at least in part on at least one channel sensing beam, of the one or more channel sensing beams, being within a footprint of the particular channel sensing beam.

8. The method of claim 1, further comprising:
    applying a wait time penalty in association with performing the channel access countdown procedure for at least one of the one or more channel sensing beams.

9. The method of claim 1, wherein at least a minimum duration passes between when the channel access procedure is performed and the information is outputted.

10. The method of claim 9, wherein the minimum duration matches a channel reservation signaling periodicity.

11. An apparatus for wireless communication, comprising:
    a processing system configured to:
        perform a channel access countdown procedure for each of one or more channel sensing beams, wherein a channel sensing beam, of the one or more channel sensing beams, includes multiple transmit beams;
        determine whether a channel, associated with the multiple transmit beams, is available by using the channel sensing beam; and
        output information, for transmission via the multiple transmit beams to one or more user equipment (UEs), if the channel is available.

12. The apparatus of claim 11, wherein, when outputting the information, the processing system is configured to output the information after performing the channel access countdown procedure.

13. The apparatus of claim 11, wherein the channel access countdown procedure is performed based at least in part on a respective set of one or more channel access parameters that include at least one of:
    a contention window size;
    a randomly selected value; or
    a defer period.

14. The apparatus of claim 11, wherein the processing system is further configured to:
    perform the channel access countdown procedure for a particular channel sensing beam that includes a particular subset of transmit beams unavailable for wireless communication, wherein the particular subset of transmit beams includes the multiple transmit beams; and switch, after performing the channel access countdown procedure for the particular channel sensing beam, to the one or more channel sensing beams.

15. The apparatus of claim 14, wherein the processing system is further configured to:
reset a counter value associated with the channel access countdown procedure for the particular channel sensing beam.

16. The apparatus of claim 14, wherein the processing system is further configured to:
maintain a counter value associated with the channel access countdown procedure for the particular channel sensing beam.

17. The apparatus of claim 16, wherein the counter value is maintained based at least in part on at least one channel sensing beam, of the one or more channel sensing beams, being within a footprint of the particular channel sensing beam.

18. The apparatus of claim 11, wherein the processing system is further configured to:
apply a wait time penalty in association with performing the channel access countdown procedure for at least one of the one or more channel sensing beams.

19. The apparatus of claim 11, wherein at least a minimum duration passes between when the channel access procedure is performed and the information is outputted.

20. The apparatus of claim 19, wherein the minimum duration matches a channel reservation signaling periodicity.

21. An apparatus for wireless communication, comprising:
means for performing a channel access countdown procedure for each of one or more channel sensing beams, wherein a channel sensing beam, of the one or more channel sensing beams, includes multiple transmit beams;
means for determining whether a channel, associated with the multiple transmit beams, is available by using the channel sensing beam; and
means for outputting information, for transmission via the multiple transmit beams to one or more user equipment (UEs), if the channel is available.

22. A base station, comprising:
a processing system configured to:
perform a channel access countdown procedure for each of one or more channel sensing beams, wherein a channel sensing beam, of the one or more channel sensing beams, includes multiple transmit beams;
determine whether a channel, associated with the multiple transmit beams, is available by using the channel sensing beam; and
a transmitter configured to:
transmit information via the multiple transmit beams to one or more user equipment (UEs) if the channel is available.

23. The base station of claim 22, wherein, when transmitting the information, the transmitter is configured to transmit the information after performing the channel access countdown procedure.

24. The base station of claim 22, wherein the channel access countdown procedure is performed based at least in part on a respective set of one or more channel access parameters that include at least one of:
a contention window size;
a randomly selected value; or
a defer period.

25. The base station of claim 22, wherein the processing system is further configured to:
perform the channel access countdown procedure for a particular channel sensing beam that includes a particular subset of transmit beams unavailable for wireless communication, wherein the particular subset of beams includes the multiple transmit beams; and
switch, after performing the channel access countdown procedure for the particular channel sensing beam, to the one or more channel sensing beams.

26. The base station of claim 25, wherein the processing system is further configured to:
reset a counter value associated with the channel access countdown procedure for the particular channel sensing beam.

27. The base station of claim 25, wherein the processing system is further configured to:
maintain a counter value associated with the channel access countdown procedure for the particular channel sensing beam.

28. The base station of claim 27, wherein the counter value is maintained based at least in part on at least one channel sensing beam, of the one or more channel sensing beams, being within a footprint of the particular channel sensing beam.

29. The base station of claim 22, wherein the processing system is further configured to:
apply a wait time penalty in association with performing the channel access countdown procedure for at least one of the one or more channel sensing beams.

30. The base station of claim 22, wherein at least a minimum duration passes between when the channel access procedure is performed and the information is outputted.

* * * * *